US010827183B2

(12) United States Patent
Deen et al.

(10) Patent No.: US 10,827,183 B2
(45) Date of Patent: *Nov. 3, 2020

(54) SYSTEM AND METHOD FOR OPTIMAL VARIABLE BIT RATE PACKING

(71) Applicant: NBCUniversal Media, LLC, New York, NY (US)

(72) Inventors: Robert Glenn Deen, Universal City, CA (US); Michael Shane Wilkinson, Universal City, CA (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,728

(22) Filed: Nov. 27, 2019

(65) Prior Publication Data

US 2020/0169735 A1    May 28, 2020

Related U.S. Application Data

(63) Continuation of application No. 14/943,849, filed on Nov. 17, 2015, now Pat. No. 10,531,095.

(51) Int. Cl.
*H04N 19/146* (2014.01)
*H04N 19/172* (2014.01)
*H04L 29/06* (2006.01)

(52) U.S. Cl.
CPC ....... *H04N 19/146* (2014.11); *H04L 65/4084* (2013.01); *H04L 65/4092* (2013.01); *H04L 65/80* (2013.01); *H04N 19/172* (2014.11)

(58) Field of Classification Search
CPC .......................... H04N 19/146; H04N 19/176
See application file for complete search history.

(56) References Cited

U.S. PATENT DOCUMENTS

| | | | |
|---|---|---|---|
| 6,785,338 | B1 | 8/2004 | Reitmeier et al. |
| 10,531,095 | B2 | 1/2020 | Deen et al. |
| 2010/0158101 | A1 | 6/2010 | Wu et al. |
| 2011/0302319 | A1* | 12/2011 | Ha .................... H04N 21/6581 709/231 |

(Continued)

OTHER PUBLICATIONS

U.S. Appl. No. 14/943,849, Office Action dated Feb. 8, 2018, 8 pages.

(Continued)

*Primary Examiner* — Zhubing Ren
(74) *Attorney, Agent, or Firm* — Lee, Hong, Degerman, Kang & Waimey PC

(57) ABSTRACT

Systems and methods for optimal variable bit rate packing are disclosed. Some embodiments include encoding media at a plurality of bit rates to generate a corresponding plurality of encodings, where each of the plurality of encodings include a plurality of framesets, generating advance encoding data for each of the plurality of encodings, where each advance encoding data includes information related to a data size of the plurality of framesets of the corresponding encoding, transmitting the generated advance encoding data to a client, receiving a request from the client including a request for one or more framesets of a first encoding, and transmitting the requested one or more framesets of the first encoding to the client.

20 Claims, 8 Drawing Sheets

(56) References Cited

U.S. PATENT DOCUMENTS

2012/0079329 A1* 3/2012 Steinbach ............ H04N 19/188
714/704
2013/0243099 A1* 9/2013 Feng ...................... H04N 19/40
375/240.24

OTHER PUBLICATIONS

U.S. Appl. No. 14/943,849, Final Office Action dated Jun. 18, 2018, 10 pages.
U.S. Appl. No. 14/943,849, Office Action dated Apr. 10, 2019, 10 pages.

* cited by examiner

SYSTEM AND METHOD FOR OPTIMAL VARIABLE BIT RATE PACKING

CROSS-REFERENCE TO RELATED APPLICATIONS

This application is a continuation of U.S. patent application Ser. No. 14/943,849, filed on Nov. 17, 2015, now U.S. Pat. No. 10,531,095, the contents of which are hereby incorporated by reference herein in its entirety.

BACKGROUND

Consumers of video want the highest quality experience possible, including video at the highest resolution, the lowest compression, with the clearest image quality. However, the highest quality video requires transmitting large amounts of data at high rates with low latency and no packet loss. Most Internet connections are not capable of streaming video at its highest resolution and data rates due to bandwidth limitations. To overcome such limitations, various practices in the related art include encoding video at a variety of quality levels or bit rates, while minimizing effect to the viewer and/or content to allow the video to be enjoyed over a wide variety of Internet connection speeds.

Adaptive bit rate (ABR) streaming is one such known technique for streaming digital video over the Internet in situations involving limited bandwidth. The ABR streaming technique, such as MPEG-DASH, involves encoding a video into multiple different encodings, each at a different bit rate. Encodings at higher bit rates represent better video quality at the cost of more data which requires higher bandwidth to transmit. Each encoding is created such that there are common shared points, also referred to as I-frames, which are aligned across all bit rate encoding. These I-frames permit seamless switching between different bit rate encoding streams without missing any frames of the video.

Video playback using the ABR technique involves selecting one of the bit rate encodings and attempting to transport the data over the available network. If the network is unable to transport the selected encoding at a rate which enables smooth playback, a lower bit rate encoding is selected and the video playback is transitioned at the next I-frame switch point. If it is determined that the network is able to transport the selected encoding at a rate which enables smooth playback, then the same encoding is continued to be selected, or a higher encoding is selected and transitioned at the next I-frame switch point.

To facilitate selection of encodings and playback, playback devices are provided a list of available encodings in a manifest. The manifest lists the available encodings and the addresses of servers from which the playback device can retrieve the framesets of each encoding. Playback devices further attempt to smooth out the video playback using a video buffer. The playback device loads the video buffer with as many framesets as the video buffer will hold. For smooth playback, the fill rate of the video buffer is ideally at least as fast as the read rate of the video decoder rendering the video at the playback device. Smooth playback of the video then consists primarily of monitoring and managing the video buffer to ensure video segments are available when the video decoder of the playback device attempts to read and decode them.

However, if the buffer fill rate is unable to meet the read rate, then the playback device must select a lower bit rate encoding, resulting in less data being transmitted, to allow the buffer fill rate to increase. If the selected lower bit rate encoding still does not result in smooth playback due to the insufficient buffer fill rate, the playback device may select successively lower bit rate encodings until one is determined to meet the read rate demand.

On the other hand, if the current buffer fill rate is able to meet or exceed the read rate for the currently selected encoding, then a higher bit rate encoding may be selected to provide higher quality video playback. If the selected higher bit rate encoding still results in the buffer fill rate meeting or exceeding the read rate, the playback device may select successively higher bit rate encodings until the highest rate that is still able to meet the read rate demand is found.

This scheme of monitoring the relative performances of the buffer fill rate and the read rate, coupled with successively trying different encodings, relies solely upon using past performance and trial-and-error in order to select an optimal bit rate encoding. However, this approach assumes that the framesets of each encoding will have similar transport performance as previous framesets, or that each frameset for an encoding represents the same amount of data to be transported by the network. It also assumes that the network will be able to provide the same bandwidth for the next retrieval as it did for the previous one.

Additionally, since the playback device only decodes linear information about the media content received into the video buffer, the playback device has no information about an upcoming frameset when the playback enters trick mode, otherwise referred to as a trick play, where the user may fast forward or rewind to another portion of the media content. Once a portion is selected for normal playback, the playback device must start the trial-and-error process over again to determine a proper bit rate encoding in view of available resources.

Thus, the existing systems and methods have been unable to provide the playback device with any information in advance related to the framesets of each encoding, leaving the encoding selection and playback process to rely primarily on trial-and-error. Therefore, it may be advantageous for a system and method to present playback clients with the ability to identify in advance information on available encoding framesets to optimize data transmission and video playback.

SUMMARY

Embodiments of the present disclosure include a system and method for optimal variable bit rate packing to enable a client terminal to receive advance encoding data related to one or more bit rate encodings for media content. In some embodiments, the client terminal may utilize the advance encoding data to request and decode optimal framesets of different bit rate encodings. The advance encoding data may comprise a data tree corresponding to the framesets of one or more bit rate encodings of the media, and the data tree may include information related to a file size of one or more of the framesets. The client terminal may build an optimal graph which includes information for selected framesets of various bit rate encodings in the order in which the framesets are to be requested, received, decoded, and presented for display to a viewer.

An embodiment of a method of the present disclosure includes encoding media at a plurality of bit rates to generate a corresponding plurality of encodings, wherein each of the plurality of encodings comprises a plurality of framesets; generating advance encoding data for each of the plurality of encodings, wherein each advance encoding data comprises at least information related to a data size of the plurality of framesets of the corresponding encoding; transmitting the generated advance encoding data to a client; receiving a request from the client comprising a request for one or more framesets of a first encoding of the plurality of encodings; and transmitting the requested one or more framesets of the first encoding to the client.

Another embodiment of a method of the present disclosure includes transmitting a request for media; receiving advance encoding data for each of a plurality of encodings corresponding to the requested media, wherein each of the plurality of encodings comprises a plurality of framesets and the received advance encoding data comprises at least information related to a data size of each of the plurality of framesets of the corresponding encoding; transmitting a request for one or more framesets of a first encoding of the plurality of encodings; receiving the requested one or more framesets of the first encoding; decoding the received one or more framesets; and displaying media corresponding to the decoded one or more framesets of the first encoding.

A system according to an embodiment of the present disclosure may include a communication unit configured to receive and transmit information; a display configured to display information; a memory configured to store information; and one or more controllers configured to cause the communication unit to transmit a request for media; receive advance encoding data via the communication unit for each of a plurality of encodings corresponding to the requested media, wherein each of the plurality of encodings comprises a plurality of framesets and the received advance encoding data comprises at least information related to a data size of each of the plurality of framesets of the corresponding encoding; cause the communication unit to transmit a request for one or more framesets of a first encoding of the plurality of encodings; receive the requested one or more framesets of the first encoding via the communication unit; decode the received one or more framesets; and cause the display to display media corresponding to the decoded one or more framesets of the first encoding.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for optimal variable bit rate packing including generating and providing information of variable bit rate encodings prior to transmission of the encoding data packets. In this disclosure, the content will be discussed primarily with respect to streaming media such as internet streaming video, however, various applications of the systems and methods disclosed herein to other media are contemplated, including, but not limited to television, radio, digital video recorder media, internet radio, internet video, other forms of streaming content, virtual reality content, and the like.

Figure 1:
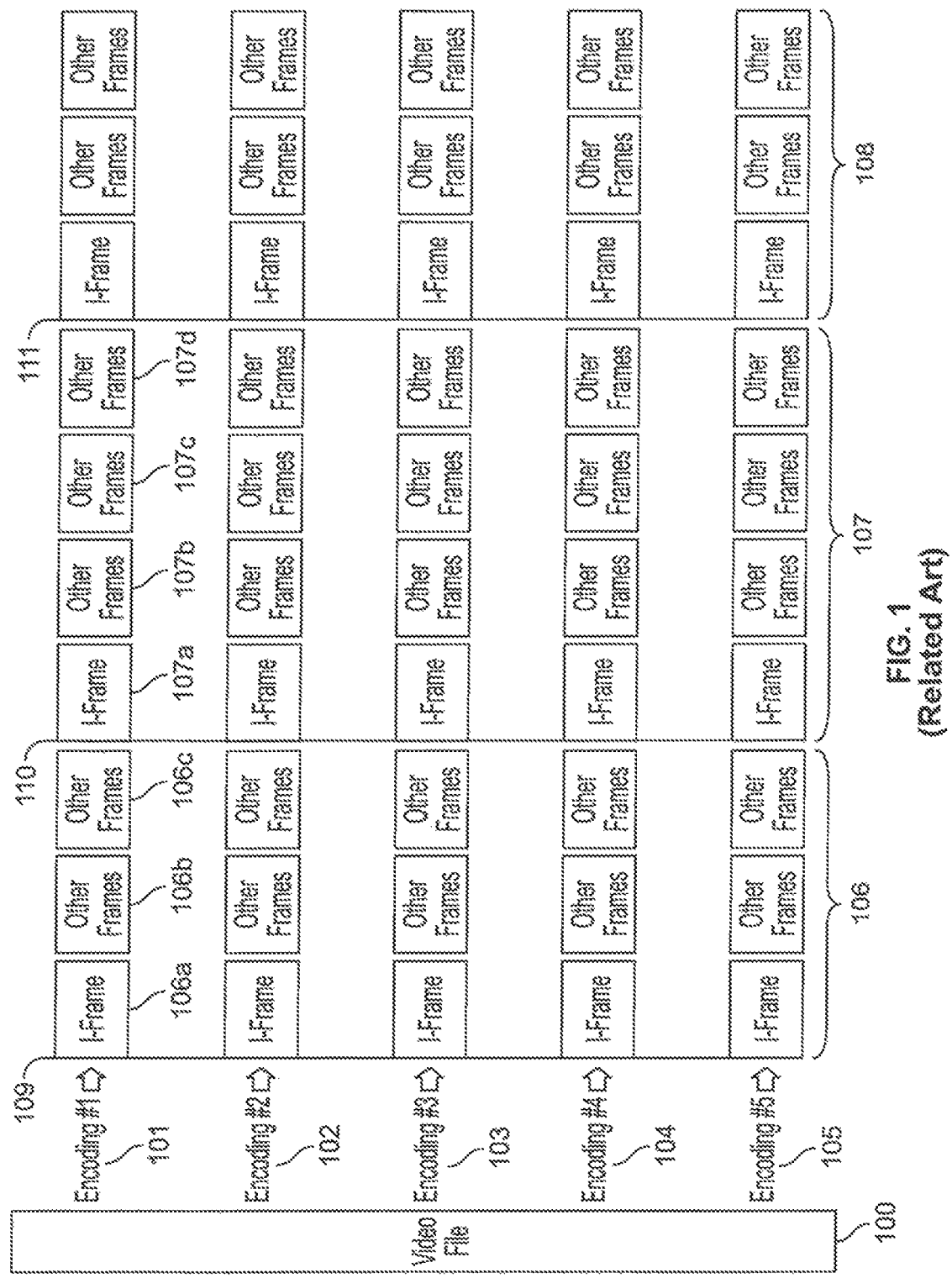
FIG. 1 is an illustration of a portion of video encoded into multiple bit rate encodings according to the related art.

FIG. 1 shows a block diagram showing various encoding data of media content 100, as known in the related art. In adaptive bit rate implementations, an encoder (not depicted) will encode an item of media content 100, such as a movie file. The encoder may be configured to encode the media content at different bit rates to produce multiple encodings 101, 102, 103, 104, 105 of the same media file. The resulting encodings will thus have different file sizes based on the level of bit rate encoding, which refers to the number of bits that are processed per second, often expressed as kilobits per second (kbps).

As is generally known, a higher bit rate encoding during compression will result in a higher quality video or audio file as more information of the video or audio is provided. Lower quality bit rate encodings may result in loss of information in the video or audio which may be noticeable to a user, such as motion blur, low dynamic range, detail clipping, and the like. Different bit rates may be used for the audio and the video aspects of a single item of media content. While this disclosure contemplates implementing the system for audio, video, or a combination of audio and video, for the purposes of this discussion, a total bit rate will be discussed, which represents a total number of the audio and video encoding bit rates.

Referring back to FIG. 1, the encoder may encode the media content 100 at five different bit rates. For example, Encoding 1 (101) may correspond to encoded data at 1800 kbps, Encoding 2 (102) may correspond to encoded data at 1200 kbps, Encoding 3 (103) may correspond to encoded data at 800 kbps, Encoding 4 (104) may correspond to encoded data at 500 kbps, and Encoding 5 (105) may correspond to encoded data at 256 kbps. The bit rates and encodings discussed with respect to FIG. 1 are by way of example only, and it will be understood that the number of encodings and encoding bit rates may vary in different embodiments of the present disclosure.

The encodings 101-105 may be broken up in to one or more segments, referred to as framesets, shown only by way of example by 106, 107, 108. Each of the framesets may be identified by a leading I-frame. For example, the frameset 106 of Encoding 1 (101) may be identified by an I-frame 106a, the frameset 107 of encoding 201 may be identified by an I-frame 207a, and so on. The I-frames may align with jump points 109, 110, 111 which correspond to the boundary between the framesets 106, 107, 108. The framesets 106, 107, 108 further include other frames 106b, 106c which may contain the encoded data corresponding to the video, audio, or other information of the media content being presented.

According to adaptive bit rate implementations of the related art, at the beginning of the media content, a playback device, also referred to as a client terminal, may request the first frameset of one of the bit rate encodings 101-105 of the media content based on information received in the manifest. The client terminal may select the first frameset at the highest available encoding, Encoding 1 (101), the lowest available encoding, Encoding 5 (105), or may select the first frameset based on various other factors such as a random selection, a previously selected bit rate encoding level, or the like. The client terminal may send a request to the server for one or more framesets of the selected encoding, and may receive information related to an address where the one or more framesets are available for retrieval, or may alternatively receive the requested one or more framesets directly from the video server. Once the requested framesets are received, the client terminal decodes the encoded data via a decoder provided at the client terminal and prepares the decoded data for playback via an output, such as a display.

The client terminal may attempt to smooth out the playback by use of a video buffer provided at the client terminal. The client terminal may load the video buffer with as many framesets of the selected encoding as the buffer will hold. For smooth playback, the fill rate of the video buffer may need to be as fast, or faster, than the read rate of the video decoder rendering the video to the output. However, if the video buffer fill rate is unable to meet the read rate of the video decoder, the playback may become choppy or delayed while the necessary framesets are retrieved and/or received and readied for decoding and playback.

To ensure smooth playback, the client terminal may monitor and manage the video buffer to ensure that framesets are available when the client terminal is ready to read and decode them for playback. If it is detected that the video buffer fill rate is unable to meet the read rate of the video decoder, the client terminal may determine that the available bandwidth cannot support the selected bit rate encoding level as the file sizes of the framesets are too large. In this case, the client terminal may use the manifest information to select a lower bit rate encoding level than the currently selected bit rate encoding level, and request the next frameset at the lower bit rate encoding level. Throughout the duration of the media content, the client terminal may repeatedly request the video server with a manifest for information on available encoding files, or the video server may alternatively repeatedly provide the client terminal with the manifest information.

Once the next frameset at the lower bit rate encoding level is received, the client terminal may switch to decoding and playback of the next frameset at the jump point, for example 110 or 111. Since all the framesets 106, 107, 108 of each encoding 101-105 are aligned at the same jump points 109, 110, 111, the client terminal can switch to receiving, decoding, and presenting playback of a lower bit rate encoding level without loss of any frames of the media content, and the transition of one bit rate encoding level to another is mostly seamless to the viewer.

During playback, if the client terminal detects that the video buffer fill rate exceeds the read rate of the decoder, the client terminal may determine that the available bandwidth can support a higher quality video stream, and thus switch to a higher bit rate encoding level. For example, if the client terminal is receiving encoded data for Encoding 4 (104) and the client terminal determines that the video buffer fill rate is higher than the read rate of the decoder, the client terminal may send a request to the server for Encoding 3 (103). If the available bandwidth is again sufficient to provide a high video buffer fill rate, the client terminal may repeatedly request a higher bit rate encoding level until a maximum available bit rate encoding is reached, or until the client terminal determines that the available bandwidth cannot support a higher bit rate encoding level.

Thus, according to the related art, the client terminal may perform a trial-and-error process whereby the client terminal increments or decrements the bit rate encoding level based on the available bandwidth. Therefore, in the last example where the client terminal may increasingly request higher bit rate encoding levels, the client terminal may have to request a next highest bit rate encoding level, for example Encoding 2 (102), and perform decoding and presentation of playback before the client terminal is able to determine whether the available bandwidth is able to handle the data transmission requirements for Encoding 2. In an example where the current available bandwidth is unable to support decoding and playback of Encoding 2 (102), this trial-and-error procedure may require the client terminal to first request and decode Encoding 2 (102) before determining that the available bandwidth cannot support it, resulting in disruption of the playback to the user.

Therefore, in embodiments of the present disclosure, the client terminal may be provided with advance encoding data related to each of the available bit rate encodings prior to the initiation of playback of the media content. The advance encoding data may include information of each available bit rate encoding, such as the total file size of the available bit rate encodings, and the file sizes of the framesets making up each available bit rate encoding. The advance encoding data may further include additional information regarding the bit rate encoding or the media content itself, such as metadata or content descriptors corresponding to framesets of each available bit rate encoding.

The advance encoding data may allow the client to analyze the data transmission requirements of each available bit rate encoding or portions thereof, and determine the appropriate bit rate encoding levels to request and receive for decoding and presenting in playback in view of the available bandwidth. In other embodiments, the advance encoding data may include information related to the media content which corresponds to each frameset or groups of framesets to allow the client terminal to consider the content when selecting a bit rate encoding level.

Figure 2:
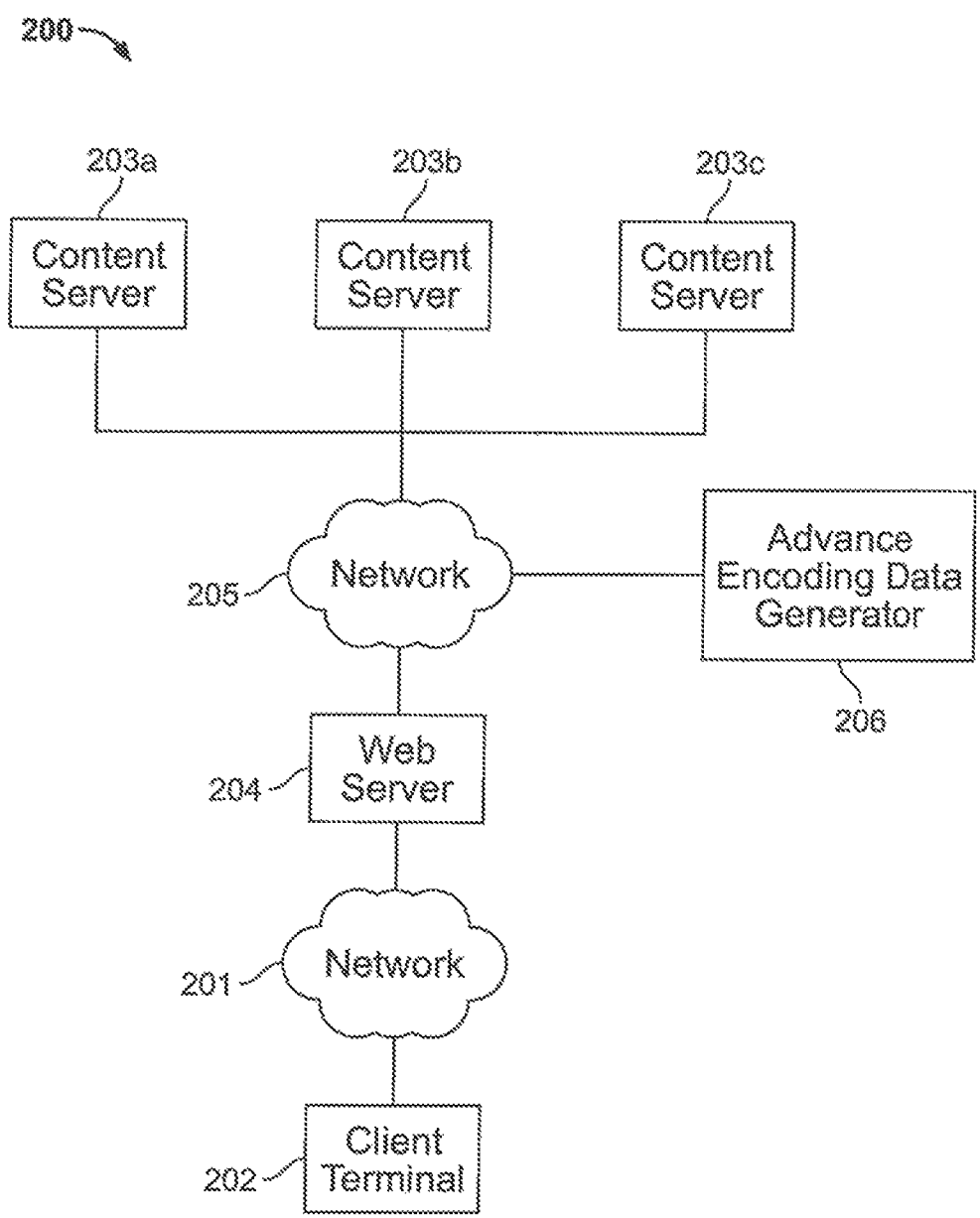
FIG. 2 is an illustration of a system for optimal variable bit rate packing in accordance with an embodiment of the present disclosure.

Referring now to FIG. 2, a system 200 for optimal variable bit rate packing according to an embodiment of the present disclosure is shown. The system 200 may include any type of system that transmits data packets over a network 201. For example, the system 200 may include a client terminal 202 such as a mobile terminal accessing streaming media data provided by one or more content servers 203a, 203b, 203c (sometimes referred to singularly or collectively as 203) via a network 201, such as the Internet. The system 200 may also include a gateway (not depicted), for example a server, a router, a firewall server, a host, a proxy server, request redirector, and the like.

The network 201 may include various systems for distribution of content including any desired combination of hardwired and wireless communication links, including wide area networks (WAN), local area networks (LAN), wireless networks suitable for packet-type communications, over-the-air, cable, internet, other network connection systems, and the like, which implement networks and hardware known and used in the related art, including broadcast technologies, cable or satellite distribution systems, internet protocol (IP), or other networked technologies, and the like, wherein examples of the content include live and recorded television, movies, internet streaming video and audio, music, radio or other audio-visual content, and the like. The system 200 may also include network 205 which may be the same network shown as 201, or another implementation of a network according to the embodiments of network 201 discussed above.

The client terminal 202 may be connected to the network 201. The client terminal 202 may be a hardware component including software code and applications which are configured to allow the client terminal to communicate, transmit, request, and receive data packets via the network 201 which may correspond to streaming media data. The client terminal 202 may include any terminal or system configured to receive a content signal, and in some embodiments, the client terminal 202 may be configured to decode received content data and prepare the content for presentation to a user via an output such as a display, audio speaker, or the like. The output may be implemented in the same hardware as the client terminal 202, or in some embodiments, the output may be implemented in a separate hardware or location from the client terminal 202.

For example, the client terminal may correspond to an Internet video streaming device, which is configured to request, transmit, and receive data packets corresponding to Internet streaming video, and the client terminal may be further configured to decode received data packets and prepare the media content to be displayed via a separate output, such as a television. In some embodiments, the client terminal 202 may also be configured to transmit information to one or more other aspects of the system 200 via the network 202 regarding the content data received and decoded by the client terminal 202.

Various embodiments of the client terminal 202 may include televisions, desktop computers, laptop computers, tablet computers, mobile smartphones, personal media devices, wearable devices, set top box receivers, streaming internet content devices, satellite television receivers, and the like. In other embodiments, the client terminal 202 may be implemented in more than one connected device. Embodiments of the client terminal 202 further include a wide range of wireless mobile terminals, such as smartphones, as wireless transmission of media content may further emphasize the need to optimize variable bit rate packing since network data transmission rates may be less reliable and have lower bandwidth, or include maximum data transmission caps.

The content servers 203 of the system 200 may include a memory and be configured to store and host data of various media content, including video, audio, and the like. The content data may include stored content data corresponding to various versions of bit rate encodings of the media content, where the various bit rate encodings correspond to the media content encoded at different bit rates. As discussed, each bit rate encoding may be broken up into a sequence of file segments, where each segment includes an interval of playback of the media content. Each file segment, otherwise referred to as a frameset, may have the same interval length as corresponding framesets of other encoding versions at a different bit rate, such that replacing one frameset from a first encoding with a corresponding frameset from a second encoding would not result in any missing fragments of the media content.

The system 200 may further include an encoder (not depicted) configured to generate bit rate encodings of the media content. The encoder may be configured to encode media content at various bit rates, or other variations of video and/or audio compression quality, and generate encodings for each quality level. The encoder may encode media content and cause the generated encoded files to be stored in memory associated with content servers 203, or in some embodiments the encoder may also be configured to encode the media content on the fly in response to a request for the particular media content. The encoder may be implemented at each content server 203a, 203b, 203c, or may be implemented separately in the system. Further, the encoder may be connected to the network 201, 205 to communicate, request, receive, and/or transmit media content information, including encoded data resulting from encoding the media content.

In the embodiment of FIG. 2, the system 200 may further include a web server 204 connected to the network 201. The web server 204 may be configured to receive requests from the client terminal 202 for media content, and provide information to the client terminal 202 in response to a request, including providing data associated with the media content or address information for retrieving files of the media content. It will be understood that web server 204 may be configured to provide information, data, and media content other than video, including audio, text, metadata, and the like, and embodiments of the disclosure are not limited. For example, web server 204 may be an enterprise server, a media server, a mobile data server, or any other type of server. In some embodiments web server 204 may be a computer or a computer program responsible for accepting requests (e.g., HTTP, RTSP, or other protocols that can initiate a media session) from client terminal 202 and serving client terminal 202 with streaming media. Although not shown in FIG. 2, embodiments are considered where the client terminal 202 is configured to transmit and receive data directly to and from the content servers 203 via a network such as 201, 205, without passing data through the web server 204.

In some embodiments, the web server 204 may be configured to provide the client terminal 202 with one or more manifest data files which include information related to the media content. The manifest data file may be provided to the client terminal 202 in response to a request for media content. The manifest may include information on suggested bandwidths for each encoding level, a location where each encoding data file is available such as an address, link, or other pointer a location where the encoding file can be retrieved, and various metadata related to the media content, such as media type, aspect ratios, codec information, and the like. In some embodiments, the manifest may be provided in the form of an XML file, however various implementations and file types are considered which are well known to those of ordinary skill in the art.

In addition to, or concurrently with the manifest, the client terminal may further be provided with information related to the requested media content, such as video frameset data, audio frameset data, available bit rate encoding data of the media content, and the like. The information of the available encoding data, referred to herein as advance encoding data, may provide the client terminal 202 with detailed advance information on the available bit rate encodings. The advance encoding data may be provided to the client terminal with the manifest, or may be provided separately in another transmission. In some embodiments, the advance encoding data may be provided within electronic program guide (EPG) metadata. In other embodiments, the advance encoding data may be transmitted as the first data received by the client terminal when receiving the media content information. For example, the first bit rate encoding frameset stored and hosted by the content servers 203 for each bit rate encoding version may include the advance encoding data within the header information.

The system 200 may further include an advance encoding data generator 206 configured to generate encoding data related to the encoding files produced by the encoder. The advance encoding data generator 206 may be connected to network 205 to communicate, transmit, or receive data between the web server 204, content servers 203, and the client terminal 201. In other embodiments, the advance encoding data generator 206 may be implemented together with the content servers 203, or the encoder (not depicted). In yet other embodiments, the advance encoding data generator 206 may be separate from the encoder and the content servers 203, and directly operably coupled with the content servers 203, the encoder, or the web server 204 via the one or more networks.

The advance encoding data generator 206 may be configured to generate advance encoding data for each of the available bit rate encodings generated by the encoder. The advance encoding data may include data for video streams as well as audio streams of the media content, however in some embodiments the advance encoding data may include data for only video or only audio. The web server 204 may be configured to provide the manifest to the client terminal 102 with the advance encoding data in response to a request from the client terminal 102. As discussed, the advance encoding data may be provided to the client terminal separately from the manifest, and may be provided by the advance encoding data generator 206, the content server 203, a third party server, or the like. Based on the advance encoding data, the client terminal 102 may perform a determination of which bit rate encodings are to be requested prior to initiating playback of the media content.

Additionally, in some embodiments the client terminal may also be provided with contextual information of the media content. The contextual information may be included with the advance encoding data, or may be separate and provided to the client terminal separately. For example, referring back to FIG. 1, the contextual information may include information that frameset 106 corresponds to a portion of the media content having a lot of movement or action thus requiring a higher bit rate encoding level to present the scenes in a sufficiently high video quality, and that frameset 107 corresponds to a portion of the media content having very little movement or action. The contextual information about the media content may be determined by the size of the frameset files since higher levels of movement or action in the media content will result in a larger frameset file size, and so on. In other embodiments, the contextual information may be determined by media detection and analysis methods and systems known to those of ordinary skill in the art, such as object recognition, image recognition, facial recognition, audio recognition, voice recognition, closed captioning text analysis, and the like.

Based on the contextual information, the client terminal may determine that frameset 106 should be received at a higher bit rate encoding level, and that frameset 107 should be received at a lower bit rate encoding level. The client terminal may consider not only the available bandwidth for receiving the frameset transmissions, but may also consider other factors which may require optimizing the selection of encodings, for example latency, CPU usage, buffer size, or data transmission limits, for example where the client terminal corresponds to a wireless mobile terminal and data transmission is capped or charged to the user at a fee. These and other features of the present disclosure will be discussed in further detail below.

Figure 3:
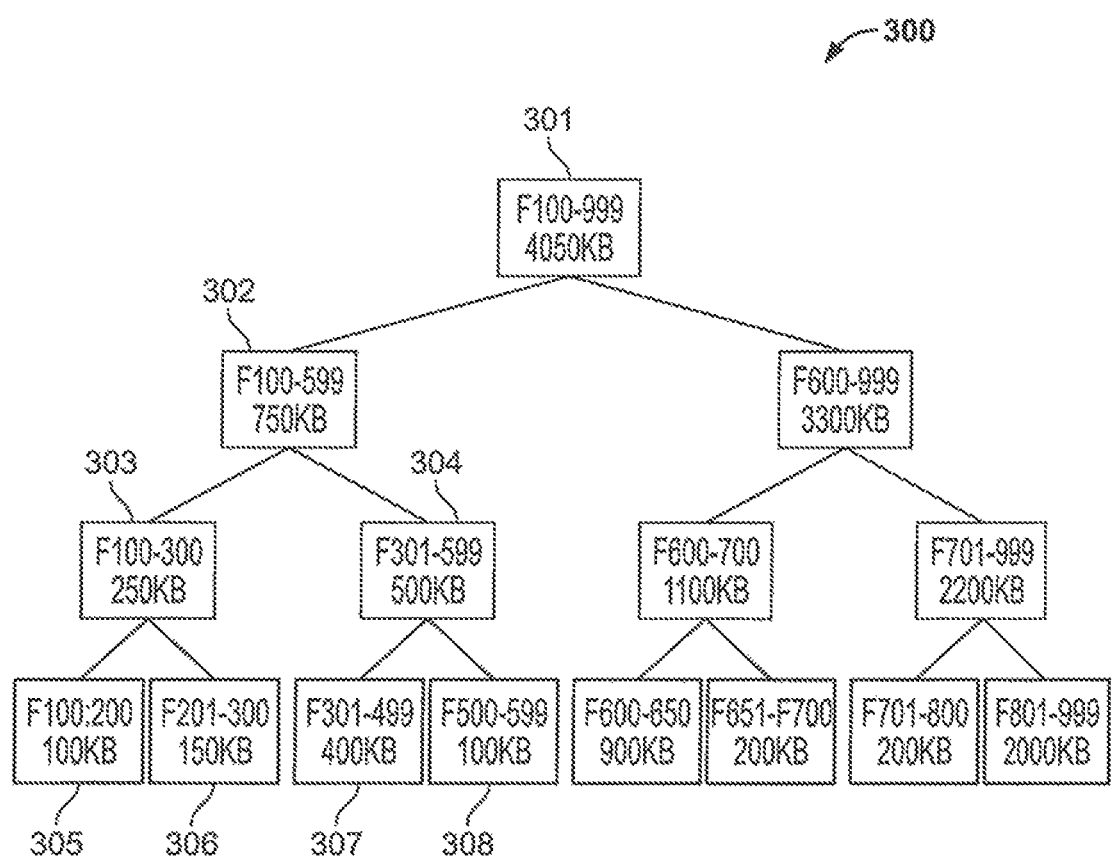
FIG. 3 is an illustration of a data tree corresponding to a bit rate encoding in accordance with an embodiment of the present disclosure.

In an embodiment of the present disclosure, the advance encoding data may include a data tree having at least file size information of the framesets of each bit rate encoding. FIG. 3 shows an illustration of an example of a frameset data tree 300 according to one embodiment. The frameset data tree may be built for each bit rate encoding and transmitted to the client by the web server, the encoder, the content server, a third party source, or the like as discussed. In the frameset data tree, the higher nodes of the tree represent aggregate values of the lower nodes, providing easily accessible information which becomes more and more granular as the tree is traversed downward.

For example, the root node 301 may include an aggregated file size of all child node file sizes. Therefore the root node 301 of the data tree corresponds to the total file size of the entire encoding, or 4050 KB. Internal node 302 represents the aggregate file sizes of child nodes 303 and 304 of 750 KB, and internal node 303 represents the aggregate file sizes of external nodes 305 and 306 of 250 KB.

Each node of the data tree may further identify the range of frames or frameset numbers included in the associated file size value. For example, since root node 301 is associated with the entire media content, it indicates that the file size 4050 KB is associated with framesets 100-999. Node 302 indicates that the file size 750 KB is associated with framesets 100-599, and so on.

In this way, the frameset data tree may provide an easily accessible data representation of the framesets which comprise the encoding. Thus, once the client terminal receives the frameset data tree in the advance encoding data, the client terminal may quickly and efficiently traverse the frameset data tree to identify desired framesets, or groups of framesets, for requesting from the video server or content servers.

Further, since the higher nodes of the frameset data tree aggregate the lower descendent nodes, the frameset data tree may allow the client terminal to identify framesets and make broader determinations without analyzing and managing each individual frameset. For example, instead of comparing a data size of a single frameset of a first frameset data tree with the data size of another single frameset of another second frameset data tree (for example at the level of nodes 305, 307), the client terminal may compare data sizes of groups of framesets, or internal nodes (for example at the level of nodes 303, 304), in selecting an optimal bit rate encoding.

In some embodiments of the system, the advance encoding data generator may be implemented at the encoder which may be configured to generate a frameset data tree concurrently with generating the bit rate encoding. The generated frameset data tree may then be stored and hosted along with the bit rate encoding files at the content server 203. In other embodiments, the encoder may store the generated frameset data tree in another terminal or memory to be associated with the bit rate encoding files stored and hosted at the content server 203. In yet another embodiment, the encoder may be configured to generate the frameset data tree at the time the request for the media content is received from the client terminal. In such embodiments, the frameset data trees for each encoding may be provided to the client terminal together with, or separately from, the manifest related to the media content.

In some embodiments, as shown in FIG. 2, the advance encoding data generator 206 may be provided separately in the system 200 and configured to receive information of all encoding files for an item of media content and generates corresponding frameset data trees for each encoding. The generated frameset data trees may then be stored in the corresponding content servers 203 with the encoding files, stored in a memory associated with the advance encoding data generator 206, or stored in another location connected to the network 205 and associated with the bit rate encoding files.

Figure 4:
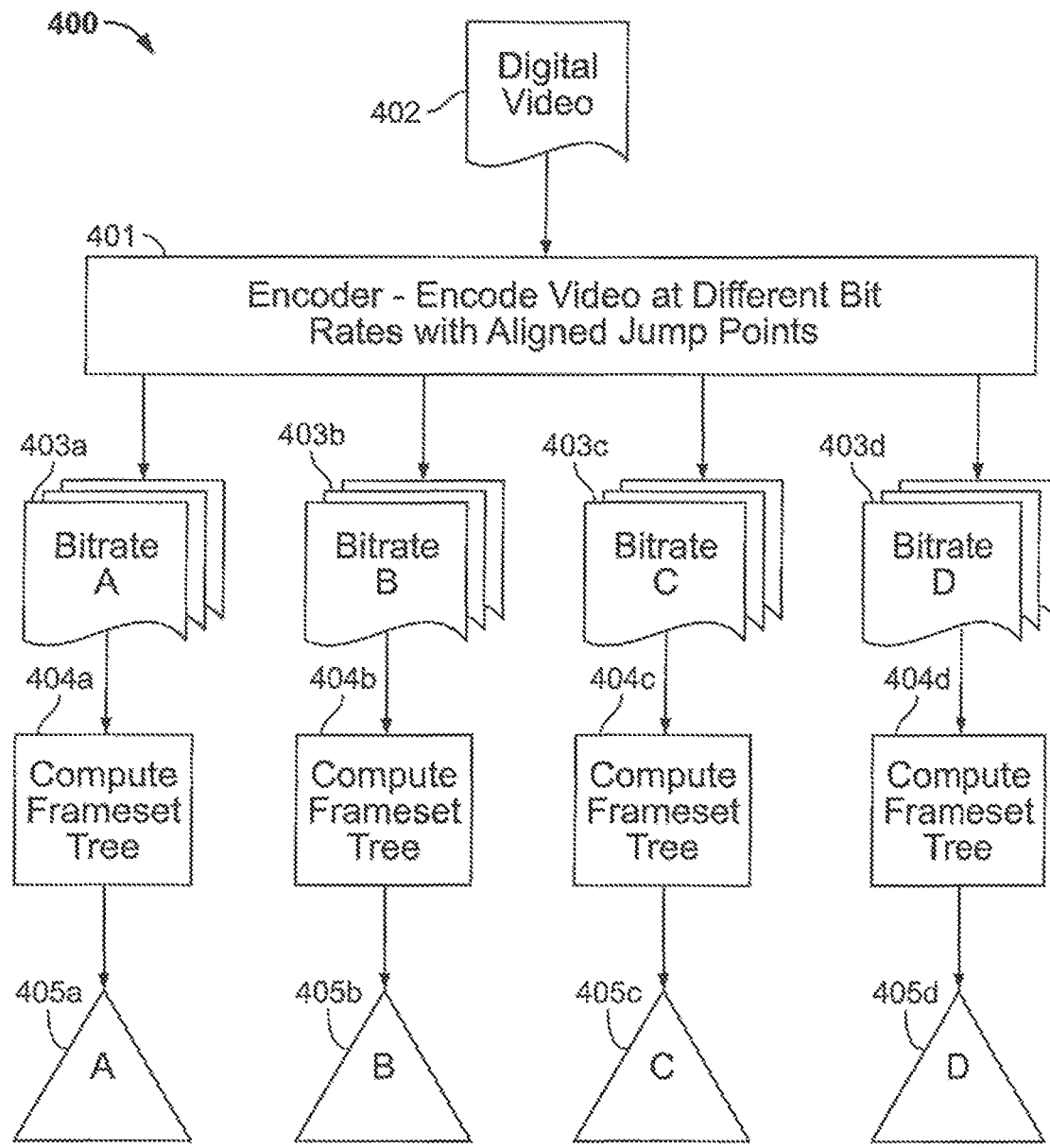
FIG. 4 is an illustration of a process of generating data trees corresponding to advance encoding data in accordance with an embodiment of the present disclosure.

Referring now to FIG. 4, an example of a process is shown for generating the advance encoding data. Provided with an item of media content such as a digital video 402, the encoder 401 may encode the digital video at different bit rates with aligned jump points. The encoder produces an encoding 403a, 403b, 403c, 403d for each bit rate, where each bit rate encoding consists of multiple encoded frameset files which correspond to one or more framesets of the digital video. The frameset files of one encoding 403a corresponds to the same intervals as the frameset files of all other encodings 403b, 403c, 403d of the digital video to allow switching between frameset files of different bit rate encodings at the aligned jump points without missing any portion of the digital video.

The advance encoding data generator may then compute frameset trees 404a, 404b, 404c, 404d for each of the encodings 403a-403d. As discussed, each frameset tree 405a-405d may include information about the total size of each encoding, where each node represents a portion of the digital video and aggregates the file sizes of its descendent nodes. The frameset trees 405a-405d may enable a client terminal to perform top level analysis of the framesets which make up the digital video to select the desired framesets from selected encodings based on the advance knowledge of the data transmission cost required for each frameset. Further, the frameset trees 405a-405d may be coupled with contextual information related to the video content to provide the client terminal with contextual information of the frameset file size data.

Figure 5:
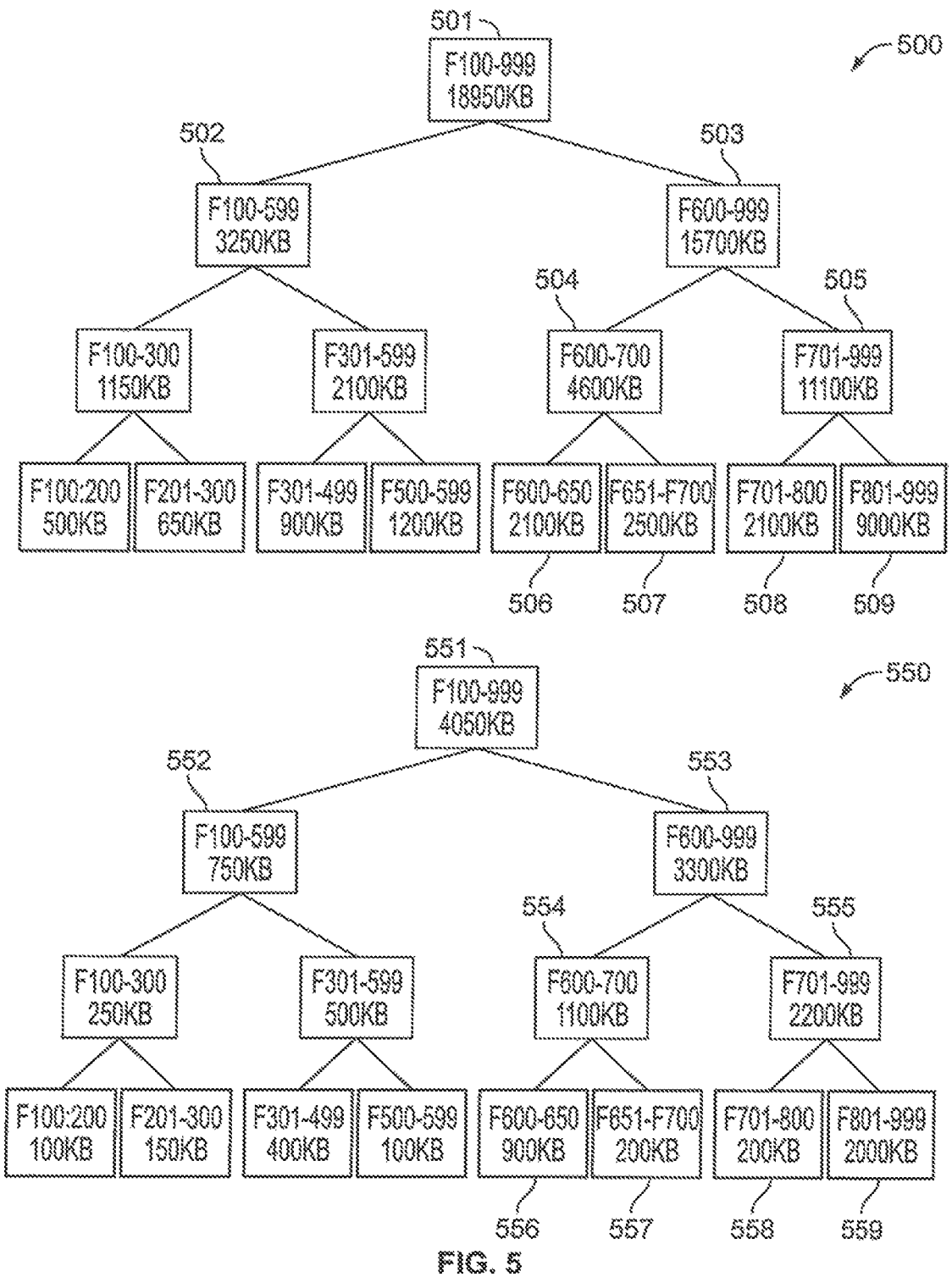
FIG. 5 is an illustration of two data trees corresponding to two different bit rate encodings in accordance with an embodiment of the present disclosure.

As an example, FIG. 5 shows two different frameset trees 500, 550 which correspond to different bit rate encoding levels for the same media content, such as a movie. Frameset tree 550 may correspond to an encoding bit rate level of 800 kbps (total of audio and video bit rates) generating a total data size of 18950 KB, indicated by root node 501. Frameset tree 500 may correspond to an encoding bit rate level of 256 kbps generating a total data size of 4050 KB, indicated by root node 551. For the purposes of this discussion, only two frameset trees 500, 550 are discussed, however it will be understood that less than or more than two frameset trees corresponding to multiple encodings may be provided and utilized by the client terminal.

The client terminal may obtain frameset trees 500, 550 and examine the frameset data using data tree traversal algorithms known to those of ordinary skill in the art, including depth first, pre-order, in-order, post-order, breadth first, and the like. Based on traversing the tree and examining the nodes representing the framesets of the video file, the client terminal may build an optimal playback graph comprising pointers to selected nodes, framesets (external node), or groups of framesets (internal node) of frameset tree 500 or frameset tree 550. In other embodiments, the client terminal may be configured to implement various other data structures to represent the selected optimal framesets, including arrays, an optimized data tree, object oriented implementations, and the like.

Selection of particular framesets or groups of framesets may be based on various factors. For example, in certain circumstances where total data transmission usage is unlimited, the client terminal may simply try to obtain the highest quality video in view of available bandwidth, latency, and CPU usage, and thus the optimal playback graph may consist of the entire frameset tree 500. Alternatively, in situations where data transmission usage must be minimized, the client terminal may simply try to obtain the smallest data files, and thus the optimal playback graph may consist of the entire frameset tree 550.

However, in some embodiments the client terminal may attempt to optimize the playback graph given certain limitations, such as limited data transmission usage set for the particular movie, limited local data storage set for the particular movie, limited time for receiving data transmission of the particular movie, and the like. In such circumstances, it may not be optimal to simply select the highest quality encodings or the smallest file sizes, and the client terminal may examine the provided frameset trees for optimization.

For example, where the client terminal corresponds to a smartphone, the user may wish to receive transmission of a movie for local storage on the smartphone for later offline viewing, as is often the case when users are about to lose connection for their mobile terminals such as prior to boarding a long distance airplane flight or prior to heading to remote locations with no available cellular networks. In such situations, the client terminal may be tasked with receiving and locally storing the streaming movie file at optimal encoding levels to ensure quality viewing, while at the same time minimizing the file size to avoid taking up too much local storage space. The client terminal may include various settings for user selection to govern the optimization, such as a setting to prioritize storage space, video quality, or a balanced selection to optimize based on the client's analysis of the video file.

At initiation, the client terminal may receive the manifest along with the frameset trees 500, 550. In some embodiments, the client terminal may also receive contextual information related to the content of the video file which corresponds to the frameset tree information. For example, the contextual information may include metadata regarding the various scenes of the video which correspond to each frameset (external node) or group of framesets (internal node). The contextual information may provide information on the type of scene within the movie to provide context for determining the framesets or group of framesets for selection. In some embodiments, the contextual information may include descriptors such as high action, medium action, low action, dialog scene, scenery only, and the like, or in some embodiments the contextual information may include numerical or other form of rankings such as 10 for maximum movement, 0 for no movement, and the like.

In some embodiments, the rankings information may be associated with importance to the content of the video, for example a climactic scene may have a ranking of 1 (high importance) although it does not contain a lot of movement compared to another action scene which has a lot of movement but low ranking of 9 based on its insignificance to the overall storyline. Further, in some embodiments the contextual information provided to the client terminal may include data or rankings information based on multiple factors. For example, the client terminal may be provided with a first contextual information file including rankings information for every scene within the video based on contextual importance to the storyline. Additionally, the client terminal may be provided with a second contextual information file including rankings or quantitative measurement information for every scene within the video based on the amount of dialog included in the scene, and a third may be provided which includes rankings or quantitative measurement information for the amount of movement or action included in each scene.

The contextual information provided to the client terminal may be generated by the encoder at the time of encoding, or in another embodiment it may be generated by the advance encoding data generator at the time the frameset trees are generated. The contextual information may be generated by performing content analysis on the video using various methods known in the related art, including object recognition, facial recognition, movement analysis and motion compensation, audio analysis, speech recognition, text recognition, closed captioning analysis, and the like. To perform such content analysis, the system 200 may further include or be connected to content analyzers and reference content databases to facilitate analysis of media and recognition of audio and video. Alternatively, the contextual information may be based on metadata provided by a metadata source, such as the content provider or a third party metadata source.

The contextual information may be generated to correspond to the frameset tree data by including frameset reference numbers to be associated with each contextual information item. Alternatively, the contextual information may reference only the corresponding time intervals within the video, which may be used by the client terminal to match up with the identified framesets of the frameset trees. For example, contextual information which is indicated to correspond to time 1:50:00 to 1:58:00 within the video may be determined to correspond to frames 680 to 790 within the encoding. Based on this information, if the client terminal determines that the framesets corresponding to the contextual information should be selected, the client terminal may search the frameset tree 500 to select frameset 508 for requesting and receiving. Alternatively, the contextual information may be associated with stored information indicating the frames 680 to 790 which can be used by the client terminal to traverse the frameset tree 500 to select node 508.

Based on the contextual information, the client terminal may be able to identify which framesets are to be selected in a higher bit rate encoding and which are to be received in a lower bit rate encoding. This determination may be based on various decision algorithms, such as selecting a high bit rate encoding for the framesets corresponding to a scene with a high importance ranking, selecting a low bit rate encoding for framesets corresponding to a scene with a high level of dialogue despite having a high level of movement, prioritizing high bit rate encodings for high importance scenes with a high level of action, and the like. Various decision algorithms are considered by this disclosure which enables the client terminal to optimize the data transmission to receive and present the video to the user in a desired configuration.

As an example, the client terminal may detect settings which govern optimization of video quality while minimizing total data transmission, such as a smartphone tasked with downloading and locally storing a streaming video for later viewing. The smartphone may receive the advance encoding data comprising the frameset trees 500, 550, and may also receive contextual information related to the video content. The contextual information may indicate that the scenes corresponding to frames 605-660 have a high level of dialogue and low level of importance, and that the scenes corresponding to frames 655-780 have a low level of movement with a zoomed-out perspective (based on body and object recognition).

Based on the contextual information for frames 605-660, the client terminal may identify framesets 506 and 556 and compare the total data transmission cost of each, 2100 KB and 900 KB respectively. Since the contextual information indicates that the corresponding scene includes a high level of dialogue and low level of importance, the client terminal may select frameset 556 for requesting and receiving as the client terminal may determine that a high bit rate encoding is not required for the content. The client terminal may store a pointer to frameset 556 in an optimal graph or linked list.

Next, based on the contextual information for frames 655-780, the client terminal may identify the frameset groups 507, 508 and 557, 558, and compare the total data transmission cost of each frameset group, 4600 KB and 400 KB, respectively. As the contextual information indicates that the corresponding scene includes a low level of movement, the smaller data transmission framesets may be selected. However, since the contextual information also indicates that the perspective of the scenes is zoomed-out (the size of all characters, objects, movements are detected to be very small within the scene), a higher bit rate may be required to present the scene in higher quality video in order for the viewer to be able to discern what is taking place in the scene. Accordingly, based on the combination of contextual information, the client terminal may select the frameset group 507, 508, despite the higher data transmission cost. The client terminal may again store a pointer to the framesets 507, 508 in an optimal graph or linked list.

In yet another example, the frameset trees 500, 550 may be utilized by the client terminal when playback enters trick mode, such as when a user skips to a non-linear portion of the video by fast forwarding or rewinding playback of the video. As previously discussed, the client terminals of known implementations of adaptive bit rate streaming have no knowledge of the media content or video file other than the immediately upcoming information provided in the video buffer. Thus, once a play command is received at a particular portion of the video after fast forwarding or rewinding, the client terminal must repeat a trial-and-error process and conduct continuous monitoring and adjustment in response to the trick play in order to eventually identify an appropriate bit rate encoding for playback.

In an embodiment of the present disclosure, the client terminal is provided with the manifest which may include the advance encoding data, or the advance encoding data may be provided separately. Referring again to FIG. 5, the advance encoding data may include the frameset trees 500, 550. When the video playback is fast forwarded and a play command is received at a non-linear playback position, the client terminal may traverse the frameset trees 500, 550 to identify the frameset corresponding to the currently selected position and immediately obtain information on data transmission costs of the currently selected frameset for each bit rate encoding level. The client may also consider factors such as available bandwidth, latency, and CPU usage to select a frameset of an appropriate bit rate encoding level to immediately present optimized playback to the user, thereby avoiding the initial blind selection of a bit rate encoding and required subsequent monitoring and adjustment thereof.

As discussed, the client terminal may build optimal graphs including information such as pointers to the selected framesets of the various bit rate encodings. Therefore, the optimal graph may include linked pointers in an order corresponding to the media content and in which the selected framesets are to be requested, received, decoded, and presented for display to the user. In some embodiments, the client terminal may be configured to store the optimal graph to be associated with the media content for use upon the next request for the same media content. Alternatively, the client terminal may send the generated optimal graph to the web server or content servers for storing in a memory, to be used when the same media content is requested by another client terminal.

In other embodiments, the web server or content servers may store the optimal graph selected by the client terminal in a memory to be associated with the media content for use upon the next request for the same media content by the same or different client terminal. In these embodiments, the web server or content servers may also store additional information to be associated with the optimal graph, such as transmission time, client terminal location, latency and other network conditions, and the like, and numerous variations of optimal graphs and the additional information may be stored in connection with the media content. Thus, when the same media content is requested by the client terminal or another client terminal, the web server or content server may identify the stored optimal graph that is most closely matched with the current conditions, such as transmission time, client terminal location, latency and other network conditions, and the like. Based on this matched similarity, the web server or content server may identify and select a stored optimal graph for transmission of the media content data to the newly requesting client terminal.

In other embodiments, the client terminal may be configured to reconfigure the optimal graph based on environmental changes affecting the data transmission, or other event. In many of the embodiments discussed herein, the client terminal may receive the advance encoding data and build the optimal graph, or complete a substantial portion of the optimal graph, for the content prior to initiating decoding and playback of the first frameset. However, when an event occurs, such as a drop in bandwidth, increase in latency, or increase in CPU usage, the client terminal may modify the optimal graph to replace one or more selected framesets. The modifications may include removing the next upcoming node of the graph and reevaluating the frameset trees to generate new graph nodes beginning from the removed node. Alternatively, the modifications may include pruning only the next one or more node from an optimal data tree, and grafting one or more nodes in place of the removed node based on a reevaluation of the frameset trees.

In yet another embodiment, the evaluation of frameset trees, selection of framesets, and building of optimal graphs may be performed by the web server, or other centralized computing device of the system 200. The web server may perform the operations previously discussed with respect to embodiments of the client terminal, and provide the client terminal only with the framesets of bit rate encodings that have been pre-selected by the web server. In such configurations, the client terminal may be configured to receive provided data packets, and provide telemetry data to the server with respect to the success of transmissions and receipt of data packets, latency of data packets, video buffer information, decoder read time of the buffer, and the like. Based on the received telemetry data, the web server may continually modify the optimal graph according to the embodiments discussed above, and provide the client terminal with selected framesets according to the optimal graph.

Figure 6:
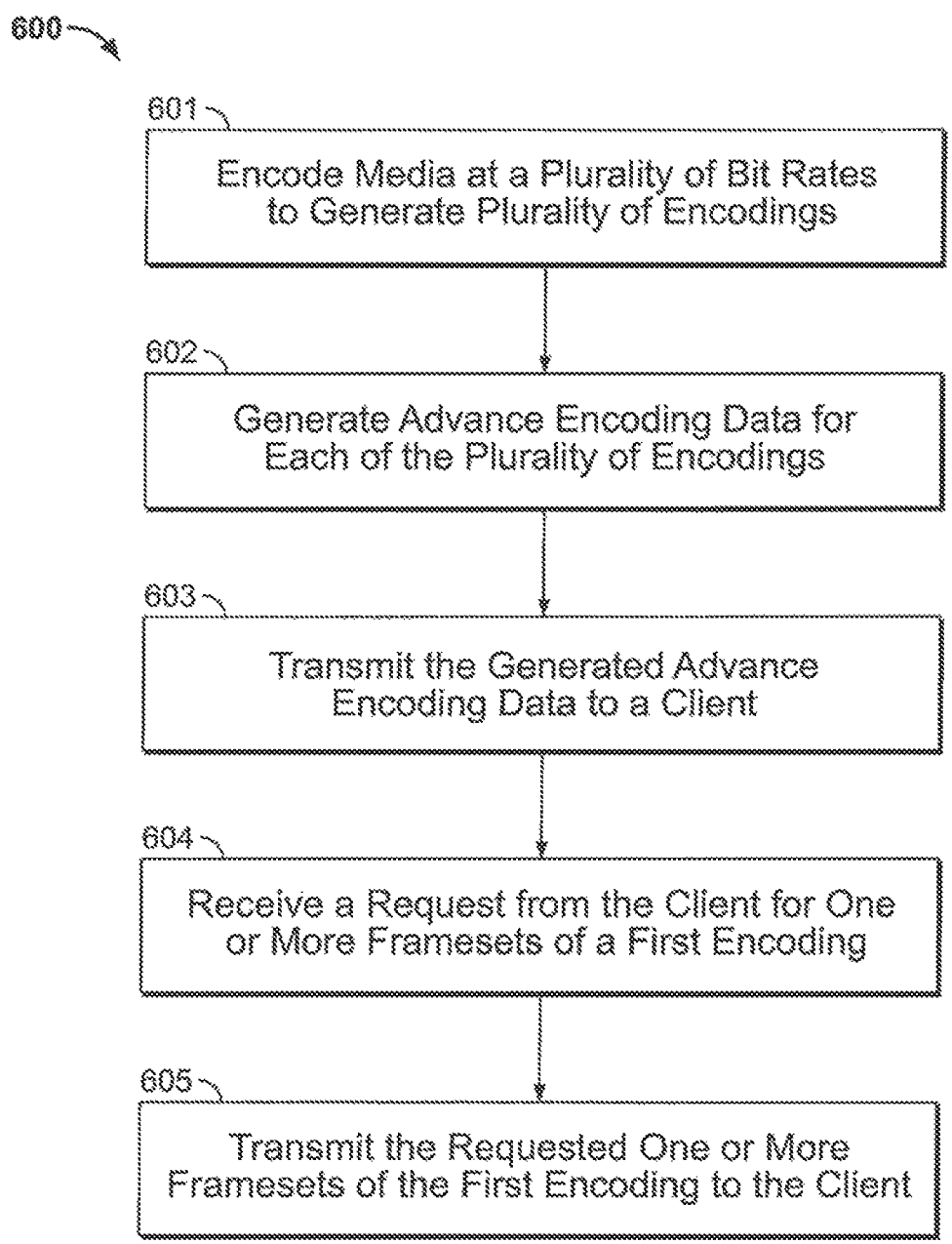
FIG. 6 is an illustration of a method of optimal variable bit rate packing in accordance with an embodiment of the present disclosure.

Referring now to FIG. 6, a method 600 of optimal variable bit rate packing according to one embodiment of the present disclosure will be discussed. The method 600 may include encoding media at a plurality of bit rates at block 601 to generate a corresponding plurality of encodings. As discussed, each of the plurality of encodings may comprise a plurality of framesets, and the number of encodings may vary. The method 600 may further include generating advance encoding data at block 602 for each of the plurality of encodings, wherein each advance encoding data comprises at least information related to a data size of the plurality of framesets of the corresponding encoding. The generated advance encoding data may then be transmitted to a client 603, and a request may be received 604 from the client comprising a request for one or more framesets of a first encoding of the plurality of encodings. The method 600 may further include transmitting the requested one or more framesets of the first encoding to the client 605.

As previously discussed, in some embodiments the advance encoding data generator, the client terminal, the encoder, the content servers, the web servers, or other aspects of the disclosed system may comprise one or more software or hardware computer systems and may further comprise or be operably coupled to one or more hardware memory systems for storing information including databases for storing, accessing, and querying various content, encoded data, advance encoding data, metadata, and the like. In hardware implementations, the one or more computer systems incorporate one or more computer processors and controllers.

The components of the various embodiments discussed herein may each comprise a hardware processor of the one or more computer systems, and in one embodiment a single processor may be configured to implement the various components. For example, in one embodiment, the advance encoding data generator, the encoder, the content servers, and the web servers, or sub combinations thereof, may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system 200 may be operably coupled to communicate information, and the system may further include various hardware and software communication modules, interfaces, and circuitry to enable wired or wireless communication of information.

Figure 7:
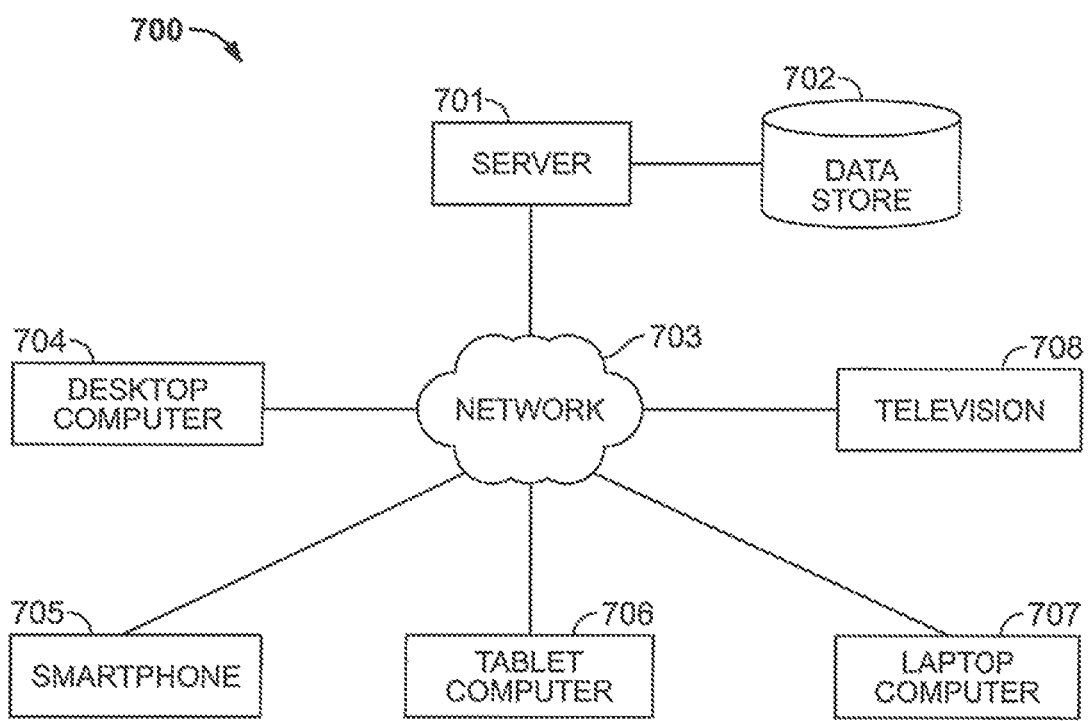
FIG. 7 is an illustration of a computing environment in accordance with an embodiment of the present disclosure.
Figure 8:
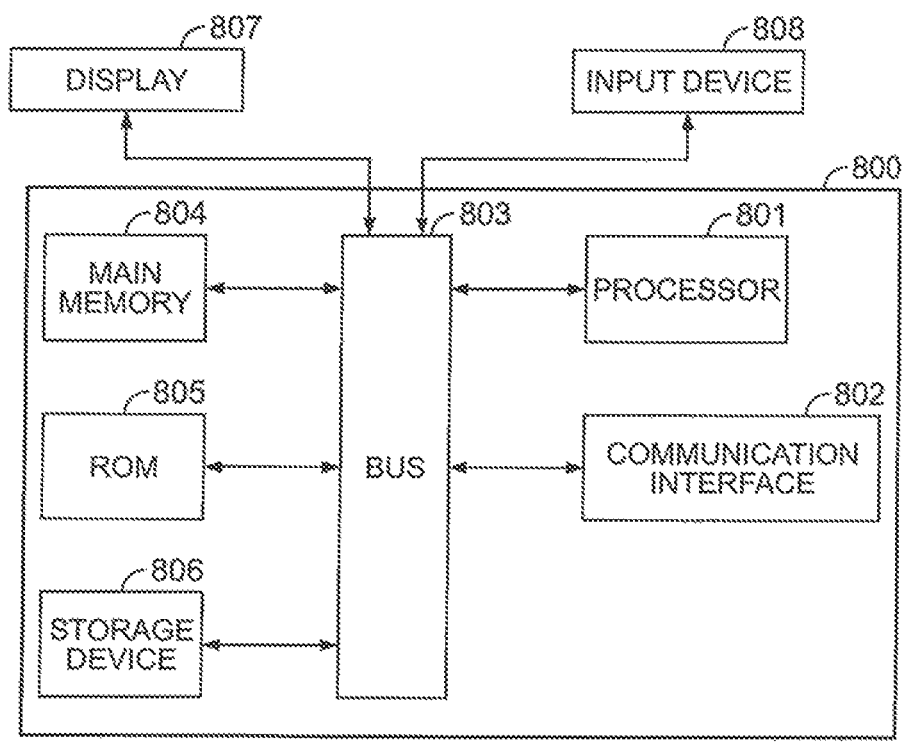
FIG. 8 is an illustration of a device in accordance with an embodiment of the present disclosure.

In selected embodiments, the features and aspects disclosed herein may be implemented within a computing environment 700 shown in FIG. 7, which may include one or more computer servers 701. A server 701 may be operatively coupled to one or more data stores 702 (e.g., databases, indexes, files, or other data structures). A server 701 may connect to a data communication network 703 comprising a local area network (LAN), a wide area network (WAN) (e.g., the Internet), a telephone network, a satellite or wireless communication network, or some combination of these or similar networks.

One or more client devices 704, 705, 706, 707, 708 may be in communication with the server 701, and a corresponding data store 702 via the data communication network 703. Such client devices 704, 705, 706, 707, 708 may include, for example, one or more laptop computers 707, desktop computers 704, smartphones and mobile phones 705, tablet computers 706, televisions 708, or combinations thereof. In operation, such client devices 704, 705, 706, 707, 708 may send and receive data or instructions from or to the server 701, in response to user input received from user input devices or other input. In response, the server 701 may serve data from the data store 702, alter data within the data store 702, add data to the data store 702, or the like or combinations thereof.

In selected embodiments, the server 701 may stream or transmit one or more video files including video content, audio content, encoded data, generated data, and/or metadata from the data store 702 to one or more of the client devices 704, 705, 706, 707, 708 via the data communication network 703. The devices may output video content from the video file using a display screen, projector, or other video output device. For example, the video file may comprise a clip of a movie, television show, live programming, news broadcast, or portion thereof for output using a display device of one or more of the client devices. In certain embodiments, the system 200 configured in accordance with the features and aspects disclosed herein may be configured to operate within or support a cloud computing environment. For example, a portion of, or all of, the data store 702 and server 701 may reside in a cloud server.

Referring to FIG. 10, an illustration of an example computer 800 is provided. One or more of the devices 704, 705, 706, 707, 708 of the system 700 may be configured as or include such a computer 800. In selected embodiments, the computer 800 may include a bus 803 (or multiple buses) or other communication mechanism, a processor 801, main memory 804, read only memory (ROM) 805, one or more additional storage devices 806, a communication interface 802, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 803 or other communication mechanism, including multiple such buses or mechanisms, may support communication of information within the computer 800. A processor 801 may be connected to a bus 803 and process information. In selected embodiments, a processor 801 may be a specialized or dedicated microprocessor configured to perform particular tasks in accordance with the features and aspects disclosed herein by executing machine-readable software code defining the particular tasks. Main memory 804 (e.g., random access memory—or RAM—or other dynamic storage device) may be connected to a bus 803 and store information and instructions to be executed by a processor 801. Main memory 804 may also store temporary variables or other intermediate information during execution of such instructions.

Read only memory 805 (ROM) or some other static storage device may be connected to a bus 803 and store static information and instructions for a processor 801. An additional storage device 806 (e.g., a magnetic disk, optical disk, memory card, or the like) may be connected to a bus 803. The main memory 804, ROM 805, and the additional storage device 806 may include a non-transitory computer-readable medium holding information, instructions, or some combination thereof, for example instructions that when executed by the processor 801, cause the computer 800 to perform one or more operations of a method as described herein. A communication interface 802 may also be connected to a bus 803. A communication interface 802 may provide or support two-way data communication between a computer 800 and one or more external devices (e.g., other devices contained within the computing environment).

In selected embodiments, a computer 800 may be connected (e.g., via a bus) to a display 807. A display 807 may use any suitable mechanism to communicate information to a user of a computer 800. For example, a display 807 may include or utilize a liquid crystal display (LCD), light emitting diode (LED) display, projector, or other display device to present information to a user of the computer 800 in a visual display. One or more input devices 808 (e.g., an alphanumeric keyboard, mouse, microphone) may be connected to a bus 803 to communicate information and commands to a computer 800. In selected embodiments, one input device 808 may provide or support control over the positioning of a cursor to allow for selection and execution of various objects, files, programs, and the like provided by the computer 800 and displayed by a display 807.

The computer 800 may be used to transmit, receive, decode, display, or the like one or more video files. In selected embodiments, such transmitting, receiving, decoding, and displaying may be in response to a processor 801 executing one or more sequences of one or more instructions contained in main memory 804. Such instructions may be read into main memory 804 from another non-transitory computer-readable medium (e.g., a storage device).

Execution of sequences of instructions contained in main memory 804 may cause a processor 801 to perform one or more of the procedures or steps described herein. In selected embodiments, one or more processors in a multi-processing arrangement may also be employed to execute sequences of instructions contained in main memory 804. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by a processor 801, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 802 may provide or support external, two-way data communication to or via a network link. For example, a communication interface 802 may be a wireless network interface controller or a cellular radio providing a data communication network connection. Alternatively, a communication interface 802 may comprise a local area network (LAN) card providing a data communication connection to a compatible LAN. In any such embodiment, a communication interface 802 may send and receive electrical, electromagnetic, or optical signals conveying information.

A network link may provide data communication through one or more networks to other data devices (e.g., client devices as shown in the computing environment 700). For example, a network link may provide a connection through a local network of a host computer or to data equipment operated by an Internet Service Provider (ISP). An ISP may, in turn, provide data communication services through the Internet. Accordingly, a computer 800 may send and receive commands, data, or combinations thereof, including program code, through one or more networks, a network link, and communication interface 802. Thus, a computer 800 may interface or otherwise communicate with a remote server (e.g., server 701), or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method comprising:
generating advance encoding data for each of a plurality of encodings corresponding to a media, wherein each of the plurality of encodings comprises a plurality of framesets each comprising one or more frames of the media, wherein:
each advance encoding data identifies groupings of framesets of the plurality of framesets of the corresponding encoding and comprises an aggregated data size for each of the groupings of the framesets,
each aggregated data size corresponds to a total data size of all frames of the framesets which make up the corresponding grouping, and
the generated advance encoding data comprises a data tree representation comprising:
a first leaf node having a first parent node, the first leaf node comprising a first data size of at least a first frameset of the corresponding encoding; and
a second leaf node having the first parent node, the second leaf node comprising a second data size of at least a second frameset of the corresponding encoding, wherein the first parent node comprises a sum of at least the first data size and the second data size; and
transmitting the generated advance encoding data for each of the plurality of encodings to a client.

2. The method of claim 1, wherein each of the plurality of framesets comprises an I-frame corresponding to one of a plurality of switch points of the media.

3. The method of claim 1, wherein each node of the data tree representation that is transmitted to the client comprises a data size of one or more different frames of the media.

4. The method of claim 1, further comprising:
receiving a request from the client comprising a request for one or more framesets of a first encoding of the plurality of encodings; and
transmitting the requested one or more framesets of the first encoding to the client.

5. The method of claim 4, further comprising:
receiving another request from the client requesting one or more framesets of a second encoding of the plurality of encodings; and
transmitting the requested one or more frameset of the second encoding to the client.

6. The method of claim 5, wherein the one or more framesets of the first encoding are encoded at a lower bitrate than the one or more framesets of the second encoding.

7. The method of claim 5, wherein the one or more framesets of the first encoding are encoded at a higher bitrate than the one or more framesets of the second encoding.

8. The method of claim 5, further comprising:
storing information related to a plurality of selected framesets corresponding to the media, wherein the plurality of selected framesets comprises the one or more transmitted framesets of the first encoding and the second encoding; and
transmitting the plurality of selected framesets to a second client according to the stored information and in response to a request for the media from the second client.

9. A system comprising:
a communication unit configured to receive and transmit information; and
one or more controllers configured to:
generate advance encoding data for each of a plurality of encodings corresponding to a media, wherein each of the plurality of encodings comprises a plurality of framesets each comprising one or more frames of the media, wherein:
each advance encoding data identifies groupings of framesets of the plurality of framesets of the corresponding encoding and comprises an aggregated data size for each of the groupings of the framesets,
each aggregated data size corresponds to a total data size of all frames of the framesets which make up the corresponding grouping,
the generated advance encoding data comprises a data tree representation comprising:
a first leaf node having a first parent node, the first leaf node comprising a first data size of at least a first frameset of the corresponding encoding; and
a second leaf node having the first parent node, the second leaf node comprising a second data size of at least a second frameset of the corresponding encoding,
wherein the first parent node comprises a sum of at least the first data size and the second data size; and transmit, via the communication unit, the generated advance encoding data for each of the plurality of encodings to a client.

10. The system of claim 9, wherein each of the plurality of framesets comprises an I-frame corresponding to one of a plurality of switch points of the media.

11. The system of claim 9, wherein each node of the data tree representation that is transmitted to the client comprises a data size of one or more different frames of the media.

12. The system of claim 9, wherein the one or more controllers are further configured to:
receive a request from the client comprising a request for one or more framesets of a first encoding of the plurality of encodings; and
transmit, via the communication unit, the requested one or more framesets of the first encoding to the client.

13. The system of claim 12, wherein the one or more controllers are further configured to:
receive another request from the client requesting one or more framesets of a second encoding of the plurality of encodings; and
transmit, via the communication unit, the requested one or more frameset of the second encoding to the client.

14. The system of claim 13, wherein the one or more framesets of the first encoding are encoded at a lower bitrate than the one or more framesets of the second encoding.

15. The system of claim 13, wherein the one or more framesets of the first encoding are encoded at a higher bitrate than the one or more framesets of the second encoding.

16. The system of claim 13, further comprising a memory, wherein the one or more controllers are further configured to:
store information in the memory related to a plurality of selected framesets corresponding to the media, wherein the plurality of selected framesets comprises the one or more transmitted framesets of the first encoding and the second encoding; and
transmit, via the communication unit, the plurality of selected framesets to a second client according to the stored information and in response to a request for the media from the second client.

17. A machine-readable non-transitory medium having stored thereon machine-executable instructions for providing media, the instructions comprising:
generating advance encoding data for each of a plurality of encodings corresponding to a media, wherein each of the plurality of encodings comprises a plurality of framesets each comprising one or more frames of the media, wherein:
each advance encoding data identifies groupings of framesets of the plurality of framesets of the corresponding encoding and comprises an aggregated data size for each of the groupings of the framesets,
each aggregated data size corresponds to a total data size of all frames of the framesets which make up the corresponding grouping, and
the generated advance encoding data comprises a data tree representation comprising:
a first leaf node having a first parent node, the first leaf node comprising a first data size of at least a first frameset of the corresponding encoding; and
a second leaf node having the first parent node, the second leaf node comprising a second data size of at least a second frameset of the corresponding encoding, wherein the first parent node comprises a sum of at least the first data size and the second data size; and
transmitting the generated advance encoding data for each of the plurality of encodings to a client.

18. The machine-readable non-transitory medium of claim 17, wherein each of the plurality of framesets comprises an I-frame corresponding to one of a plurality of switch points of the media.

19. The machine-readable non-transitory medium of claim 17, wherein each node of the data tree representation that is transmitted to the client comprises a data size of one or more different frames of the media.

20. The machine-readable non-transitory medium of claim 17, further having stored thereon instructions comprising:
receiving a request from the client comprising a request for one or more framesets of a first encoding of the plurality of encodings; and
transmitting the requested one or more framesets of the first encoding to the client.

* * * * *